US012264783B2

(12) United States Patent
Ehgartner et al.

(10) Patent No.: US 12,264,783 B2
(45) Date of Patent: Apr. 1, 2025

(54) PRESSURE VESSEL AND MOTOR VEHICLE

(71) Applicant: Bayerische Motoren Werke Aktiengesellschaft, Munich (DE)

(72) Inventors: Lorenz Ehgartner, Ebersberg (DE); Simon Hettenkofer, Munich (DE); Klaus Szoucsek, Zirndorf (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 368 days.

(21) Appl. No.: 17/761,945

(22) PCT Filed: Sep. 16, 2020

(86) PCT No.: PCT/EP2020/075829
§ 371 (c)(1),
(2) Date: Mar. 18, 2022

(87) PCT Pub. No.: WO2021/052994
PCT Pub. Date: Mar. 25, 2021

(65) Prior Publication Data
US 2022/0381403 A1   Dec. 1, 2022

(30) Foreign Application Priority Data

Sep. 19, 2019   (DE) .................. 10 2019 125 184.2
Sep. 19, 2019   (DE) .................. 10 2019 125 185.0
Sep. 19, 2019   (DE) .................. 10 2019 125 186.9

(51) Int. Cl.
*F16K 17/00*   (2006.01)
*F17C 3/08*   (2006.01)

(52) U.S. Cl.
CPC .............. *F17C 3/08* (2013.01); *F16K 17/003* (2013.01); *F17C 2201/0104* (2013.01); *F17C 2203/032* (2013.01); *F17C 2203/0604* (2013.01); *F17C 2205/0332* (2013.01);
(Continued)

(58) Field of Classification Search
CPC ............................................... F17C 2270/0184
See application file for complete search history.

(56) References Cited

U.S. PATENT DOCUMENTS 4,219,725 A * 8/1980 Groninger ................. F17C 7/04
62/48.1
8,746,274 B2 * 6/2014 Izutani ...................... C01B 3/00
137/341
10,900,612 B2 * 1/2021 Stahl ...................... F17C 13/086
(Continued)

FOREIGN PATENT DOCUMENTS

CN        103154593 A        6/2013
CN        105318180 A        2/2016
(Continued)

OTHER PUBLICATIONS

Chinese-language Office Action issued in Chinese Application No. 202080065747.9 dated Feb. 7, 2023 with English translation (17 pages).
(Continued)

*Primary Examiner* — Don M Anderson
(74) *Attorney, Agent, or Firm* — Crowell & Moring LLP

(57) ABSTRACT

A pressure vessel, in particular a cryogenic pressure vessel, has an inner vessel, an outer vessel and a chamber that can be evacuated at least partly. A motor vehicle includes such a pressure vessel.

38 Claims, 2 Drawing Sheets

(52) U.S. Cl.
CPC .. *F17C 2221/012* (2013.01); *F17C 2260/033* (2013.01); *F17C 2260/042* (2013.01); *F17C 2270/0168* (2013.01)

(56) References Cited

U.S. PATENT DOCUMENTS

| | | | | |
|---|---|---|---|---|
| 2006/0086101 | A1* | 4/2006 | Miki | F17C 1/00 |
| | | | | 62/48.2 |
| 2006/0086102 | A1* | 4/2006 | Dickerson | F17C 3/085 |
| | | | | 141/82 |
| 2006/0096993 | A1* | 5/2006 | Takashima | F17C 1/06 |
| | | | | 220/495.01 |
| 2010/0146992 | A1* | 6/2010 | Miller | F17C 3/04 |
| | | | | 62/53.2 |
| 2010/0236259 | A1 | 9/2010 | Brunner et al. | |
| 2013/0187374 | A1* | 7/2013 | Karlsson | F17C 1/002 |
| | | | | 285/47 |
| 2014/0326737 | A1* | 11/2014 | Kampitsch | F02M 21/0221 |
| | | | | 222/464.2 |
| 2015/0064585 | A1* | 3/2015 | Hyde | F02M 21/0221 |
| | | | | 123/3 |
| 2015/0300571 | A1* | 10/2015 | Szoucsek | F17C 3/04 |
| | | | | 141/4 |
| 2016/0161058 | A1 | 6/2016 | Moddemann | |
| 2017/0261159 | A1* | 9/2017 | Stahl | F17C 13/025 |

FOREIGN PATENT DOCUMENTS

| | | |
|---|---|---|
| CN | 105683643 A | 6/2016 |
| CN | 106852167 A | 6/2017 |
| DE | 10 2015 213 563 A1 | 6/2016 |
| DE | 10 2015 204 623 A1 | 9/2016 |
| DE | 10 2015 223 263 A1 | 6/2017 |
| DE | 10 2016 215 531 A1 | 7/2017 |
| DE | 10 2016 215 534 A1 | 7/2017 |
| DE | 10 2017 212 424 A1 | 1/2019 |
| EP | 2 217 845 B1 | 11/2008 |

OTHER PUBLICATIONS

International Search Report (PCT/ISA/210) issued in PCT Application No. PCT/EP2020/075829 dated Mar. 11, 2021 with English translation (seven (7) pages).

German-language Written Opinion (PCT/ISA/237) issued in PCT Application No. PCT/EP2020/075829 dated Mar. 11, 2021 (11 pages).

German-language Search Report issued in German Application No. 10 2019 125 185.0 dated May 19, 2020 with partial English translation (11 pages).

* cited by examiner

PRESSURE VESSEL AND MOTOR VEHICLE

BACKGROUND AND SUMMARY

The document DE 10 2015 204 623 A1 has disclosed a cryogenic pressure vessel with a mounting for the attachment of an inner vessel, in the case of which fiber-reinforced pipes arranged one inside the other form a heat dissipation path between the inner vessel and outer vessel. This embodiment requires a relatively large amount of structural space.

The document EP 2 217 845 B1 has disclosed a cryogenic pressure vessel with a heat exchanger for warming the fuel. A disadvantage of this technology is that the pressure vessel is relatively heavy, large, complex and expensive inter alia owing to the heat exchanger, and it is furthermore only possible for heat to be introduced if fuel is extracted.

The document DE 10 2015 213 563 A1 has disclosed a barrier layer for preventing constituents escaping from the plastics material layer from passing into the vacuum. There is a need to make the barrier layer even more robust. It is known to equip pressure vessels with mechanical overpressure safety valves which trigger if a limit pressure is reached.

It is a preferred object of the technology disclosed here to reduce or eliminate at least one disadvantage of a previously known solution, or to propose an alternative solution. In particular, it is a preferred object of the technology disclosed here to improve a cryogenic pressure vessel in particular with regard to costs, structural space requirement, weight, robustness and/or operating characteristics. Further preferred objects may arise from the advantageous effects of the technology disclosed here. The object(s) is/are achieved by the subject matter of the independent claim. The dependent claims constitute preferred refinements.

The technology disclosed here relates to a pressure vessel for a motor vehicle (for example passenger motor vehicles, motorcycles, utility vehicles). The pressure vessel serves for storing fuel that is gaseous under ambient conditions. The pressure vessel may for example be used in a motor vehicle that is powered by compressed natural gas or liquefied natural gas (LNG) or by hydrogen. Such a pressure vessel generally supplies fuel to an energy converter (for example fuel cell system, internal combustion engine). The pressure vessel may be part of an anode subsystem of a fuel cell system. The anode subsystem comprises all fuel-conducting components of the fuel cell system.

A cryogenic pressure vessel can store fuel in the liquid or supercritical state of aggregation. The supercritical state of aggregation refers to a thermodynamic state of a substance that has a temperature and a pressure higher than the critical point. The critical point refers to the thermodynamic state in which the densities of gas and liquid of the substance coincide, that is to say said substance is present in single-phase form. Whilst one end of the vapor-pressure curve in a p-T diagram is characterized by the triple point, the other end constitutes the critical point. In the case of hydrogen, the critical point lies at 33.18 K and 13.0 bar. A cryogenic pressure vessel is in particular suitable for storing the fuel at temperatures that lie considerably below the operating temperature (this means the temperature range of the vehicle surroundings in which the vehicle is to be operated) of the motor vehicle, for example at least 50 Kelvin, preferably at least 100 Kelvin or at least 150 Kelvin below the operating temperature of the motor vehicle (generally approximately −40° C. to approximately +85° C.). The fuel may for example be hydrogen that is stored in the cryogenic pressure vessel at temperatures of approximately 34 K to 360 K.

The pressure vessel, in particular an inner vessel of a cryogenic pressure vessel, may be configured for a nominal operating pressure (also referred to as nominal working pressure or NWP) of approximately 350 barg (=positive pressure in relation to atmospheric pressure) or more, preferably of approximately 500 barg or more, and particularly preferably of approximately 700 barg or more. The fuel is stored in the inner vessel. The outer vessel at least partially surrounds the inner vessel and closes off the pressure vessel to the outside. The cryogenic pressure vessel preferably comprises an at least partially evacuated space with an absolute pressure in the range from $10^{-9}$ mbar to $10^{-1}$ mbar, furthermore preferably from $10^{-7}$ mbar to $10^{-3}$ mbar and particularly preferably of approximately $10^{-5}$ mbar, which space is arranged at least in certain regions between the inner vessel and the outer vessel. Storage at temperatures (slightly) above the critical point has the advantage over storage at temperatures below the critical point that the medium being stored is present in single-phase form. There is thus, for example, no boundary between liquid and gaseous. The inner vessel may comprise a liner. The liner forms the hollow body in which the fuel is stored. The liner may be produced for example from aluminum or steel or from the alloys thereof. The inner vessel may comprise at least one fiber-reinforced layer. The fiber-reinforced layer may surround a liner at least in certain regions, preferably entirely. The fiber-reinforced layer is often also referred to as laminate or casing or reinforcement. As a fiber-reinforced layer, use is generally made of fiber-reinforced plastics, for example carbon-fiber-reinforced plastics and/or glass-fiber-reinforced plastics. The fiber-reinforced layer expediently comprises reinforcement fibers embedded in a plastics matrix. The fiber-reinforced layer often comprises endless fibers, which are preferably introduced into the fiber-reinforced layer by winding and/or braiding.

According to the technology disclosed here, provision may be made for the pressure vessel to have a connecting end piece that is connected to the liner and/or to the fiber-reinforced layer. Such a connecting end piece is also referred to as a boss. The connecting end piece is preferably produced from a metal material. The connecting end piece is particularly preferably cohesively connected to the liner, for example by at least one weld seam. In one embodiment, the liner and the connecting end piece are produced from the same material. The connecting end piece is particularly preferably arranged parallel, and particularly preferably coaxially, with respect to the pressure vessel longitudinal axis. The connecting end piece generally projects into the internal volume of the inner vessel. The connecting end piece is preferably of pot-shaped form, wherein a peripheral wall, which projects into the inner vessel, and a face wall form the pot shape. An internally situated face side of the connecting end piece is, when the latter is installed, arranged so as to be set back inwardly in relation to the end of the inner vessel in the direction of the pressure vessel longitudinal axis.

The inner vessel may preferably be mechanically coupled to the outer vessel by means of at least one connecting element. The inner vessel is preferably coupled at both ends to the outer vessel by means of in each case one connecting element. The connecting element is expediently produced at least partially from a fiber composite material. The connecting element furthermore preferably comprises at least one fiber-reinforced pipe. The connecting element (in particular the fiber-reinforced pipe) is expediently formed as a heat dissipation path such that, in the installed state, at least 70% or at least 80% or at least 95% or at least 99% of the heat that is introduced into the connecting element at the outer vessel is not transmitted through the connecting element to the inner vessel. With regard to the pipes and the fastening of the pipes, the mounting may be configured as disclosed in the German published patent application with the publication number DE 10 2015 204 623 A1. The entire content of the German published patent application with the publication number DE 10 2015 204 623 A1 is hereby incorporated by reference. In one particularly preferred refinement, the connecting element is configured as a connecting element that can be plugged into the connecting end piece. It is preferably possible here for at least one outer circumferential surface of the connecting element to lie against an inner circumferential surface of the connecting end piece, for example with a slight interference fit. Such a configuration is advantageous inter alia with regard to the installation process and vacuum-tightness. It is furthermore thus possible for the vacuum space between the inner vessel and the outer vessel to be reduced. In particular, the outer circumferential surface of the connecting element and the inner circumferential surface of the connecting end piece may be configured to be displaceable relative to one another in the direction of the pressure vessel longitudinal axis for the purposes of compensating for changes in length. Thus, with the interposition of possible sliding elements, a floating bearing can be implemented particularly easily.

It is particularly preferable for a fixed bearing to be provided at the end at which the filling and extraction line is provided, and for a floating bearing to be provided at the opposite end.

At least one electrical heating element for warming the fuel may be provided in the inner vessel. Any suitable heating element, for example a resistance heating element, may be used for this purpose. Such a heating unit is relatively simple and inexpensive. The heating element is preferably configured as a heating rod. The heating unit is expediently configured to generate a temperature of approximately 80° C. to 350° C. or 100° C. to 200° C. at its heating surface. The heating element may, when installed, run parallel and particularly preferably coaxially with respect to the pressure vessel longitudinal axis of the inner vessel. The heating element may run in the pressure vessel longitudinal axis of the pressure vessel or substantially in the pressure vessel longitudinal axis. The heating element is thus advantageously arranged in the center of the pressure vessel. The heating element is advantageously configured as a heating rod with one free end. This is advantageous in particular with regard to the installation of the heating element and the more uniform warming of the fuel. The heating element may be surrounded at least in certain regions by a metal sleeve. The heating element may in particular be provided at that end of the inner vessel which is situated opposite the other end, at which the line for filling and/or extraction is provided. Such a configuration is advantageous in terms of manufacturing. It is likewise conceivable for the heating element to be provided at the end at which the line for filling and/or extraction is provided. It would advantageously be possible here for a mixing element to be provided on the heating element, which mixing element mixes fuel that flows in during the refueling process. Alternatively or in addition, it would be possible for a refueling line that projects into the internal volume to be supported on the heating element. The ratio of the heating length, projecting into the internal volume of the inner vessel, of the heating element to the total length of the inner vessel preferably lies between 0.1 and 0.8 or between 0.25 to 0.5, wherein the heating length (that is to say the length of the heat-imparting surface of the heating element) is the numerator and the total length of the inner vessel (that is to say the length of the inner vessel from one end to the other end) is the denominator. The heating element may protrude, so as to project into the internal volume, from the internally situated and set-back face side of the connecting end piece. The heating element may have a metal sleeve which surrounds the heating element and which provides a fuel-tight shielding or housing action with respect to the fuel. The metal sleeve may be connected in fuel-tight fashion to the connecting end piece, in particular by means of a cohesive connection, preferably by means of at least one weld seam.

The face side is spaced apart from the fiber-reinforced layer, which surrounds the liner at least in certain regions, such that the heat generated by the heating element cannot warm the fiber-reinforced layer to a temperature above a limit temperature. The limit temperature may for example be determined in tests, or may be specified taking into consideration possible technical specifications such as standards etc. For example, the limit temperature may lie in the range from approximately 50° C. to 150° C., or from approximately 70° C. to 120° C., or from approximately 80° C. to 90° C. The pot-shaped connecting end piece thus simultaneously serves as a heat dissipation path in order that as little heat as possible is introduced by heat conduction into the fiber-reinforced layer such that the fiber-reinforced layer is not thermally damaged. It is advantageously thus possible for the heating element to be operated at higher temperatures, such that the required heat exchange surface—and thus also the heating element itself—can be made smaller. The electrical lines of the heating element are particularly preferably routed within the connecting element.

The fiber-reinforced layer and/or the liner may form or jointly form a plastics material layer. In particular, during the production of the fiber-reinforced layer, for example by winding and/or braiding, gas inclusions can more commonly occur that cannot be entirely removed. These gas inclusions could ingress into the evacuated space. According to the technology disclosed here, a barrier layer can separate the plastics material layer from the evacuated space in substantially gas-tight fashion. The barrier layer serves to reduce and preferably prevent outgassing products, which are embedded in the plastic, from permeating into the evacuated space. For example, out of the three sub-steps of sorption, diffusion and desorption that determine permeation, the barrier layer may be configured to impede specifically diffusion. For this purpose, the barrier layer may offer as small as possible a free volume, that is to say, for example in the case of polymers, only little free space between the molecule chains. Substantially gas-tight means that negligibly small gas quantities, which do not have a significant effect on the quality of the vacuum, remain disregarded, for example extremely small quantities of gases that diffuse through the barrier layer. The expression "substantially gas-tight" always also encompasses the expression "gas-tight". The barrier layer expediently surrounds at least 70% or at least 90% or at least 99% of the internal volume. The barrier layer itself advantageously constitutes the delimitation or outermost layer or ply of the inner vessel with respect to the evacuated space. The barrier layer itself is expediently produced from a material that does not exhibit outgassing, such that a deterioration of the insulation as a result of barrier layer outgassing can be avoided. The barrier layer may be configured as a metal layer, composed in particular of aluminum, steel and/or copper and the alloys thereof. The barrier layer may alternatively be produced from a plastic that is a barrier to fuel, for example ethylene-vinyl alcohol copolymer (EVOH). It is generally the case that a high filler content or a high degree of crystallinity of a thermoplastic, and a high degree of crosslinking in the case of elastomers and thermosets, impedes diffusion. The barrier layer preferably has a layer thickness of approximately 0.1 mm to 5 mm or of approximately 0.25 mm to approximately 2 mm, or of approximately 0.5 mm to approximately 1 mm. The barrier layer particularly preferably forms a body (also referred to as hard containment or encapsulation), i) in the interior of which the plastics material layer and the internal volume of the inner vessel is provided and ii) which is substantially gas-tight with respect to the evacuated space present at the outer side of the body. It is advantageously possible for a surface coating to form the barrier layer. It is however also possible for a gap to be formed at least in certain regions between the barrier layer and the plastics material layer. Such a gap may for example be dimensioned such that different thermal expansions in a radial direction of different material layers, for example the liner, the fiber-reinforced layer and/or the barrier layer, can be compensated for. It is also possible for outgassed substances to collect in the space, jointly formed by the gap, between the plastics material layer and the barrier layer. The space jointly formed by the gap is preferably formed such that outgassed substances cannot pass into the evacuated space. In the case of the technology disclosed here, the gas inclusions that are present in the plastics material layer would not have an adverse effect on the long-term insulation characteristics of the pressure vessel. At the same time, a relatively large amount of fuel can be stored in the inner vessel owing to the relatively high inner vessel pressures in conjunction with the low temperatures.

The barrier layer may comprise a length compensation device that is configured to compensate for changes in length of the inner vessel in substantially gas-tight fashion, in particular by reversibly elastic deformations. The length compensation device may comprise at least one corrugated bellows element. A corrugated bellows is an element that is collapsible in the manner of an accordion. By elastic deformation of the elements, which are generally in a zigzag-like arrangement, relatively large elastic deformations can be implemented in a small structural space. The length compensation device is preferably arranged directly adjacent to (and particularly preferably at) that end of the inner vessel which is configured as a floating bearing. It is particularly preferable if the fixed bearing is provided at that end of the inner vessel at which the filling and extraction line is led out of the inner vessel, and the floating bearing is formed at the opposite end. The barrier layer may comprise an annular plate that extends radially outward (that is to say perpendicular to the pressure vessel longitudinal axis) from the connecting end piece. The length compensation device may be fastened to the outer edge of the annular plate. The annular plate generally comprises, in the center, a passage hole in which the connecting end piece is arranged. The annular plate may have a connecting flange at the passage hole. The annular plate could likewise be produced as a single piece with the connecting element. The maximum outer diameter of the barrier layer may be greater than the maximum outer diameter of the annular plate. The annular plate and/or the length compensation device may be arranged so as to be set back in an axial direction of the inner vessel in relation to an outer delimitation of the connecting end piece. In other words, the plate and/or the length compensation device preferably protrudes neither radially nor axially. Rather, the length compensation device is arranged in a generally unused annular region of the polar caps. The barrier layer, in particular the length compensation device and/or the annular plate, may be produced from a metal material, preferably from aluminum, steel and/or copper and the alloys thereof. It is expedient for at least some and preferably all elements of the barrier layer to be cohesively connected to one another, in particular by weld seams. It is thus easily and reliably possible to create a substantially gas-tight barrier layer that fully surrounds the inner vessel. The barrier layer is particularly preferably connected cohesively, and in substantially gas-tight fashion, to one or both connecting end pieces of the inner vessel. Alternatively or in addition to the cohesive attachment of the annular plate to the connecting element, a force-fitting connection (for example interference fit by shrink-fitting) or form-fitting connection is also possible. The gap may form a substantially gas-tight space between the plastics material layer and the barrier layer. The pressure vessel is expediently configured such that the gas composition in the substantially gas-tight space can be evaluated from the outside. Sensors installed in the space could be used for this purpose. The substantially gas-tight space particularly preferably comprises at least one test connection that is led out of the outer vessel. The outgassing can thus be easily checked. Alternatively or in addition, the substantially gas-tight space can be evacuated, at least to a certain degree, via said test connection. Said test connection then thus serves as an evacuation connection. At least one radiation insulator may be arranged outside the barrier layer.

The technology disclosed here comprises, inter alia, a pressure vessel for storing fuel in a motor vehicle, having a pressure relief device for relieving the pressure vessel of pressure, wherein the pressure relief device has at least one thermally activatable pressure relief apparatus; and wherein the pressure relief apparatus is directly fluidically connected to the internal volume of the pressure vessel via a pressure relief line. The pressure vessel may be a high-pressure gas vessel or a cryogenic pressure vessel, in particular of the kind disclosed herein. In this context, the expression "directly fluidically connected" means that, in the flow path between the internal volume of the pressure vessel and the pressure relief line, no shut-off element (for example valve) is provided that could block the flow path. It is likewise expedient for no shut-off element to be provided between the internal volume of the pressure vessel and the thermally activatable pressure relief apparatus disclosed here and/or the overpressure discharge valve disclosed here. A possibly non-functional shut-off valve therefore cannot prevent the relief of pressure. At least during the intended storage and extraction of fuel, the pressure in the pressure relief line always deviates by less than 10%, or by less than 5%, from the pressure in the internal volume of the pressure vessel. Greater pressure differences could arise during the relief of pressure. The relief of pressure is the process by which the pressure in the pressure vessel is reduced. The triggering event is in particular not the intended extraction for the provision of a supply to an energy converter, but is generally a fault situation. The relief of pressure generally begins with the at least partial opening of a valve and/or of a rupture element that is directly fluidically connected to the pressure vessel. If a malfunction of some other component, and/or external thermal and/or mechanical action (for example an accident, local fire, etc.), causes a fault situation, then the pressure relief device is configured to reduce the pressure in the pressure vessel. The pressure relief device may expediently be configured, for the relief of pressure from the pressure vessel, to allow a fuel extraction mass flow that is greater (for example at least by a factor of 2, 5, 10, 100 or more) than the maximum fuel extraction mass flow through the extraction path to the at least one energy converter (generally through at least one tank shut-off valve). The pressure relief device, in its entirety, is generally not used for the filling of the pressure vessel system and/or for the extraction of fuel for the provision of energy in the motor vehicle during operation in the absence of a fault situation. A flow path that is at least partially parallel to the anode subsystem may expediently be used for the relief of pressure. In general, the relief of pressure results in the pressure vessel internal pressure being lowered to atmospheric pressure.

The technology disclosed here may comprise at least one thermally activatable pressure relief apparatus, also referred to as thermal pressure relief device (TPRD) or thermal safeguard. It is generally provided adjacent to the pressure vessel. Under the action of heat (for example from fire), the fuel stored in the pressure vessel is released into the surroundings by the TPRD. The pressure relief apparatus releases the fuel as soon as the triggering temperature of the TPRD (for example 110° C.) is exceeded (is thermally activated). The TPRD expediently comprises a fusible link or a glass ampule. The TPRD may be fluidically connected to a pressure relief line. The pressure relief apparatus may be directly fluidically connected to the internal volume of the pressure vessel via the pressure relief line.

The pressure vessel may comprise at least one rupture element for the purposes of relieving pressure. The pressure relief apparatus and the rupture element are advantageously directly fluidically connected to the internal volume of the pressure vessel, for example by being directly connected to or integrated into the pressure relief line. The rupture element is preferably configured as a rupture disk. The rupture element is generally relatively inexpensive, requires little structural space and is very reliable. In particular, the rupture element may trigger if the pressure increases to a rupture pressure of the rupture element, which is higher than the maximum operating pressure of the pressure vessel and which is preferably also higher than the triggering pressure of the overpressure safety valve disclosed here. It is advantageously possible for a large mass flow to escape very quickly through the rupture element. The rupture element may in particular be an irreversibly triggering element. The rupture element may be provided outside the outer vessel. In particular, this is therefore not the rupture element that safeguards the outer vessel. For this purpose, a further rupture element may be provided in the wall of the outer vessel, which further rupture element is fluidically connected to the evacuated space. The rupture element for relieving pressure is generally less expensive than a second safety valve. The rupture element advantageously also reduces the number of pressure lines that would otherwise be required for a second safety valve. Furthermore, a further flow path would have to be led out of the outer vessel in order to discharge the fuel in the direction of the underbody paneling during the relief of pressure. The further flow path would however result in an increase in the introduction of heat into the inner vessel. The overall result is a pressure relief device which is relatively inexpensive, fail-safe and optimized in terms of structural space.

The system disclosed here comprises at least one overpressure discharge valve for discharging fuel. The thermally activatable pressure relief apparatus and the overpressure discharge valve are advantageously directly fluidically connected to the internal volume of the pressure vessel, for example by being directly connected to or integrated into the common pressure relief line. The overpressure discharge valve may be an apparatus which can be opened by the pressure in the pressure vessel and which can be closed again. The overpressure discharge valve allows in particular a gradual or abrupt escape of the fuel into the surroundings or into a collecting device external to the vehicle. Such a collecting device may for example be used during servicing work. The overpressure discharge valve preferably opens as soon as the pressure in the pressure vessel system has reached the maximum operating pressure of the pressure vessel, or shortly before this. The triggering pressure of the overpressure discharge valve preferably lies below the triggering pressure of the overpressure safety valve disclosed here, and/or below the triggering pressure of the rupture element disclosed here.

At least one fuel converter is provided downstream of the overpressure discharge valve. The fuel converter may for example be a catalytic converter. In particular, the fuel converter may be configured to catalytically convert the fuel (for example hydrogen), which escapes through the overpressure discharge valve or from other regions of the anode subsystem, with oxygen from the ambient air (in the case of hydrogen, the reaction product is water). The fuel converter and the overpressure discharge valve are also referred to as a blow-off management system or as a boil-off management system. The fuel converter and the overpressure discharge valve are configured to synthetically convert fuel in order to thus compensate for an internal pressure that increases owing to an introduction of heat into the inner vessel (during relatively long inactive standstill periods of the motor vehicle).

The technology disclosed here furthermore relates to an extraction path that leads to an energy converter, wherein at least one further overpressure valve is provided in the extraction path, and wherein the further overpressure valve is fluidically connected to the fuel converter such that the fuel released from the extraction path via the further overpressure valve is catalytically converted in the fuel converter. Furthermore, in the extraction path, there may be provided a pressure reducer which reduces the pressure in the extraction path from a first pressure level upstream of the pressure reducer to a second pressure level downstream of the pressure reducer. The further overpressure valve may be provided downstream of the pressure reducer. Fuel that escapes from a medium-pressure region can consequently thus be converted in the fuel converter, and said fuel does not pass, unburned, into the surroundings. A throttle element may advantageously be provided upstream of the fuel converter.

The pressure vessel system disclosed here furthermore comprises at least one overpressure safety valve. The overpressure safety valve relieves the pressure vessel system of pressure if the pressure in the pressure vessel system is, at least in certain regions, above the triggering pressure of the overpressure safety valve. The overpressure safety valve is preferably a mechanical valve that can be opened and closed again. The triggering pressure is higher than the maximum operating pressure, for example approximately 10% to approximately 20% higher than the maximum operating pressure. In particular, the overpressure safety valve is configured such that the overpressure safety valve triggers before an excessively high pressure could damage the components of the pressure vessel system. The overpressure safety valve is expediently likewise directly fluidically connected to the internal volume of the pressure vessel. The overpressure safety valve is preferably designed such that it can be inserted into the outer vessel from the outside and, when installed, is directly fluidically connected to the internal volume of the inner vessel by means of a pressure line. Such a configuration is easier to maintain. The overpressure safety valve may advantageously be provided so as to be spaced apart from the rupture element. In particular, the overpressure safety valve may be provided at a side of the pressure vessel situated opposite the side at which the rupture element is formed. The rupture element may for example be arranged at the first end of the pressure vessel, and the overpressure safety valve may be provided at the second end of the pressure vessel, which is situated opposite the first end. It can thus be achieved that, in different accident scenarios, at least the rupture element or the overpressure safety valve opens. The relief of pressure is thus made even more reliable. Furthermore, with the overpressure safety valve and the rupture element, different components are used for the relief of pressure, whereby the likelihood of a common cause fault can be reduced.

The pressure relief line may extend over the shell region of the pressure vessel, in particular over the shell region of an outer vessel of a cryogenic pressure vessel. The pressure relief line may comprise multiple line sections. The pressure relief line expediently runs parallel to the pressure vessel longitudinal axis in the shell region. The pressure relief line may have a first line end. The pressure relief line may furthermore have a second line end that opens out adjacent to the tank shut-off valve and/or in the internal volume of the pressure vessel. The first line end may also be referred to as a distal end in relation to the tank shut-off valve. The second line end may also be referred to as a proximal end in relation to the tank shut-off valve. The first line end may, in one configuration, be arranged adjacent to the first end of the pressure vessel, in particular at the transition between the shell region and the first end. The rupture element and/or the overpressure discharge valve may be formed at the first line end. If the rupture element and/or the overpressure discharge valve are spaced apart from the tank shut-off valve to a great extent (for example with a minimum spacing of 0.5 D or 0.8 D, where D is the total length of the inner vessel), then it is for example the case that the temperature of the cryogenic fuel increases before the fuel impinges on the rupture element and/or the overpressure discharge valve. Since the mass flows that flow through the overpressure discharge valve into the fuel converter are relatively low, the fuel temperature can increase considerably. These components consequently do not need to be designed for the extremely low storage temperatures in the internal volume. It is advantageously thus possible to use less expensive components.

The pressure vessel disclosed here furthermore comprises a tank shut-off valve. The tank shut-off valve is the valve whose inlet pressure substantially corresponds to the vessel pressure. The tank shut-off valve is in particular a valve which is controllable in open-loop and/or closed-loop fashion and which is in particular normally closed and which is directly fluidically connected to the internal volume of the pressure vessel. In the Regulation (EU) no. 406/2010 of the Commission of Apr. 26, 2010 implementing Regulation (EC) no. 79/2009 of the European Parliament and of the Council concerning the type-approval of hydrogen-powered motor vehicles, such a tank shut-off valve is also referred to as first valve.

The technology disclosed here furthermore relates to a filling system for a cryogenic pressure vessel, in particular for the pressure vessel disclosed here. The filling system generally comprises a cryogenic filling connection that is fluidically connected to the tank shut-off valve, which in this case is operated at cryogenic temperatures. The fluidic connection between the tank shut-off valve and the cryogenic filling connection may be equipped with thermal insulation, for example a partially evacuated space and/or insulation with foamed plastics and/or aerogels. The cryogenic filling connection may be couplable to a corresponding refueling station coupling. A further filling connection for warm refueling may additionally be provided. The two filling connections are expediently configured such that the cryogenic filling connection can receive cryogenic fuel at a fuel temperature which is lower, by at least 150 Kelvin or at least 180 Kelvin, than the lowest fuel temperature that the further filling connection can receive. For motor vehicles that are refueled with hydrogen, warm refueling is generally to be understood, in the context of the technology disclosed here, to mean a refueling process in which the fuel received in the motor vehicle is at a temperature between approximately −60° C. and approximately +50° C., and preferably between approximately −40° C. and approximately +35° C., in the tank coupling. A pressure line may advantageously be connected to the further filling connection, which pressure line, in the evacuated space, opens into the cryogenic line system, in particular upstream of the tank shut-off valve that is operated under cryogenic conditions, wherein a further tank shut-off valve and/or a pressure-limiting valve are preferably provided in said pressure line. The refueling of the pressure vessel can be reliably prevented by means of the further tank shut-off valve. The pressure limiting valve may be configured to limit the maximum refueling pressure, preferably to a pressure below the maximum admissible pressure of the pressure vessel that is allowable during the operation of the pressure vessel (generally the maximum operating pressure). In a flow path that is fluidically parallel with respect to the cryogenic tank shut-off valve, there is provided a refueling check valve that is configured to allow fuel to pass through to the pressure vessel during the refueling process, and to block the passage in other operating states (for example extraction or storage). Check valves may be provided at the filling connections, which check valves prevent a backflow of the fuel into the refueling station or into the surroundings. The refueling system described in this paragraph is functionally independent of the other features of the technology disclosed herein, and could also be used with cryogenic pressure vessels other than the pressure vessel disclosed here.

The technology disclosed here furthermore relates to a sensor arrangement for a cryogenic pressure vessel, in particular as disclosed here. The sensor arrangement comprises: i) at least one sensor element configured to detect a signal that is indicative of at least one state variable of the fuel stored in the inner vessel, for example the temperature and/or the pressure; ii) a sensor connection, which is provided on the outer vessel and by means of which an evaluation unit, for example a control unit, is connectable to the sensor element; and iii) at least one electrical line that connects the sensor element to the sensor connection. The sensor connection and/or the sensor element are preferably accommodated within an inner tank mounting, in particular within the connecting element disclosed here. This is particularly advantageous from a manufacturing aspect. The sensor connection and the sensor element are particularly preferably arranged coaxially with respect to one another. During servicing, it is thus particularly advantageously possible for maintenance to be performed on the sensor element through the cutout provided in the outer vessel for the sensor element. The connecting element may particularly advantageously serve as a guide during the exchange of the sensor element, and furthermore prevents parts from falling into the evacuated space. It is preferable if, for this purpose, the sensor connection and/or the sensor element are configured to be exchangeable from the outside. The sensor system described in this paragraph is functionally independent of the other features of the technology disclosed here and could also be used with cryogenic pressure vessels other than the pressure vessel disclosed here.

The technology disclosed here furthermore comprises a motor vehicle with at least one of the pressure vessels disclosed here. Preferably, the downstream end of the overpressure safety valve may be fluidically connected to a fuel outlet, provided at the vehicle roof, for the discharge of the fuel into the surroundings.

In other words, the technology disclosed here relates to numerous features which, although functionally independent of one another, achieve symbiotic effects in interaction. According to the technology disclosed here, provision may be made for the pressure vessel to comprise a pot-shaped boss, which is preferably welded to the liner. The fiber-reinforced inner tank mounting may be plugged into the boss such that the toroidal space between inner vessel and outer vessel can be reduced to a minimum dimension. At the fixed bearing side, the minimum dimension may be defined by the space requirement of the pipelines, in particular of the filling and extraction line. At the floating bearing side, the minimum dimension may be defined by the change in length of the inner vessel owing to different pressures and/or temperatures. It is advantageously thus possible for the structural space to be better utilized, or for more fuel to be stored in the same structural space. It is furthermore thus possible to realize a simpler construction with a lower weight. It is furthermore advantageously possible for the vacuum stability to be improved with the inner tank mounting disclosed here, because smaller quantities of gases diffuse from the fiber composite pipe into the vacuum. The pressure vessel disclosed here may comprise an electric heater. The electric heater may be installed into a metal sleeve. The sleeve may be welded to a boss. The electrical cables for the heater may be routed in the interior of the inner pressure vessel mounting at the floating bearing side. The length of the sleeve can be kept relatively short, such that no additional support is needed for the vibration loading at the tip. Between the heater and the fiber-reinforced layer, there may be provided a heat dissipation path sufficient for the relatively high temperature of for example 200° C. at the heater to be dissipated, for example in order to achieve a limit temperature of a maximum of 85° C. at the fiber-reinforced layer. The electric heater, or the sleeve surrounding it, advantageously has a smaller outer surface than previously known gas-gas heat exchangers. It is furthermore advantageously possible for the heater to be operated with a relatively high temperature, for example 200° C., and thus for the relatively small area to be compensated for, and for sufficient heat to be introduced into the pressure vessel. The heat flow may be supplied continuously and adjusted through variation of the temperature of the heater. A switching valve can advantageously be omitted. Furthermore, two fewer hydrogen-conducting lines are required. With the electric heater, a higher surface temperature is possible, and therefore the required heat flow can be transferred by way of a smaller surface area. It is also possible for any water pumps of the pressure vessel system to be of smaller dimensions. The solution disclosed here is therefore generally simpler and lighter than previously known gas-gas heat exchangers. It is furthermore advantageously possible for heat to be introduced into the fuel even when no fuel is being extracted from the pressure vessel. The introduction of heat from the outer vessel into the inner vessel can be reduced, because the heat flow can no longer pass through three pipeline walls by heat conduction. The pressure build-up time, or the loss-free standstill time, can thus be improved. The technology disclosed here generally comprises a hard containment. The hard containment comprises a permeation barrier or barrier layer, preferably composed of metal, in order to shield the fiber-reinforced layer(s) from the inner vessel. The hard containment is composed preferably of steel, in particular of high-grade steel. Said hard containment is composed of 6 components that are welded to one another. The membrane bellows is configured to allow the change in length of the inner pressure vessel (owing to temperature and/or pressure changes) without gases passing into the evacuated space.

An inner vessel configured in this way, owing to its hard containment, encloses a relatively stable vacuum. The hard containment is more robust than previously known solutions, because any changes in length of the inner pressure vessel lead not to plastic deformations but only to a reversibly elastic deformation, which does not affect the leak-tightness of the hard containment. The hard containment can furthermore be produced easily and reproducibly by welding.

The technology disclosed here can also be described by the following aspects.

1. A cryogenic pressure vessel for storing fuel in a motor vehicle, having an inner vessel 100 and an outer vessel 200, wherein an evacuated space V is arranged at least in certain regions between the inner vessel 100 and the outer vessel 200;
wherein the inner vessel 100 has a plastics material layer; wherein a barrier layer 150 is arranged at least in certain regions between the plastics material layer and the evacuated space V; wherein the barrier layer 150 is configured and arranged so as to at least reduce the passage of constituents escaping from the plastics material layer 130 into the evacuated space V; and wherein a gap S is formed at least in certain regions between the barrier layer 150 and the plastics material layer.

2. The pressure vessel according to aspect 1, wherein the barrier layer 150 comprises a length compensation device 152 which is configured to compensate changes in length of the inner vessel 100, in particular by reversibly elastic deformations.

3. The pressure vessel according to aspect 2, wherein the length compensation device 152 comprises at least one corrugated bellows element.

4. The pressure vessel according to aspect 2 or 3, wherein the length compensation device 152 is arranged directly adjacent to that end of the inner vessel 100 which is configured as a floating bearing.

5. The pressure vessel according to any one of the preceding aspects, wherein the barrier layer 150 is produced from a metal material.

6. The pressure vessel according to any one of the preceding aspects, wherein the plastics material layer is a fiber-reinforced layer 120 that surrounds a liner 110; and wherein the barrier layer 150 separates the fiber-reinforced layer 120 from the evacuated space V in substantially gas-tight fashion.

7. The pressure vessel according to any one of the preceding aspects, wherein the inner vessel 100 has a connecting end piece 140, wherein a liner 110 and/or a fiber-reinforced layer 120 are/is connected to the connecting end piece 140, wherein the connecting end piece 140 is connected cohesively and in substantially gas-tight fashion to the barrier layer 150.

8. The pressure vessel according to any one of the preceding aspects, wherein the barrier layer 150 comprises an annular plate 154 that extends radially outward from the connecting end piece 140.

9. The pressure vessel according to any one of the preceding aspects, wherein the length compensation device 152 is provided at the outer edge of the annular plate 154, and wherein the annular plate 154 and/or the length compensation device 152 is arranged so as to be set back in an axial direction in relation to an outer delimitation 146 of the connecting end piece 140.

10. The pressure vessel according to any one of the preceding aspects, wherein a substantially gas-tight space GR is formed between the barrier layer 150 and the plastics material layer; and wherein the pressure vessel is configured such that the gas composition in the substantially gas-tight space GR can be evaluated from the outside.

11. The pressure vessel according to aspect 10, wherein the substantially gas-tight space GR comprises at least one test connection, and wherein the test connection is led out of the outer vessel 200.

12. The pressure vessel according to any one of the preceding aspects, wherein at least one radiation insulator is arranged outside the barrier layer 150.

a) A pressure vessel for storing fuel in a motor vehicle, in particular according to any one of the preceding aspects 1 to 12, having a pressure relief device 170 for relieving the pressure vessel of pressure, wherein the pressure relief device 170 has at least one thermally activatable pressure relief apparatus 172, 174; and wherein the pressure relief apparatus 172, 174 is directly fluidically connected to the internal volume I of the pressure vessel via a pressure relief line 171.

b) The pressure vessel according to aspect a, furthermore comprising at least one rupture element 176, wherein the pressure relief apparatus 172, 174 and the rupture element 176 are directly fluidically connected to the internal volume I of the pressure vessel.

c) The pressure vessel according to aspect a or b, furthermore comprising at least one overpressure discharge valve 177, wherein at least one fuel converter 180 is provided downstream of the overpressure discharge valve 177; and wherein the pressure relief apparatus 172, 174 and the overpressure discharge valve 177 are directly fluidically connected to the internal volume I of the pressure vessel.

d) The pressure vessel according to any one of the preceding aspects, wherein the pressure relief device 170 comprises an overpressure safety valve 175, wherein the overpressure safety valve 175 is likewise directly fluidically connected to the internal volume I of the pressure vessel.

e) The pressure vessel according to aspect d, wherein the overpressure safety valve 175 is provided so as to be spaced apart from the rupture element 176.

f) The pressure vessel according to aspect d or e, wherein the overpressure safety valve 175 is provided at a side of the pressure vessel which is situated opposite the side at which the rupture element 176 is formed.

g) The pressure vessel according to any one of the preceding aspects, wherein the rupture element 176 is provided at a first end P1, and wherein the overpressure safety valve 175 is provided at a second end P2 that is situated opposite the first end P1.

h) The pressure vessel according to any one of the preceding aspects, comprising an inner vessel 100 and an outer vessel 200, wherein an evacuated space V is arranged at least in certain regions between the inner vessel 100 and the outer vessel 200, wherein the inner vessel 100 forms the internal volume I that stores the fuel.

i) The pressure vessel according to any one of the preceding aspects, wherein the rupture element 176 is provided outside the outer vessel 200.

j) The pressure vessel according to any one of the preceding aspects, wherein, in the wall of the outer vessel 200, there is provided a further rupture element 202 which is fluidically connected to the evacuated space V.

k) The pressure vessel according to any one of the preceding aspects, wherein a pressure relief line 171 has a first line end 178; and wherein the rupture element 176 and/or the overpressure discharge valve 177 is formed at the first line end 178.

l) The pressure vessel according to any one of the preceding aspects, wherein a pressure relief line 171 extends over the shell region of the pressure vessel, preferably of the outer vessel 200.

m) The pressure vessel according to any one of the preceding aspects, wherein the triggering pressure of the overpressure discharge valve 177 is below the triggering pressure of the overpressure safety valve 175 and/or below the triggering pressure of the rupture element 176.

n) A motor vehicle comprising at least one pressure vessel according to any one of the preceding aspects.

o) The motor vehicle according to aspect n, wherein the overpressure safety valve 175 is fluidically connected to a fuel outlet 179 provided at the vehicle roof.

i) A cryogenic pressure vessel for storing fuel in a motor vehicle, in particular according to any one of aspects 1 to 12 or a to o, having an inner vessel 100 and an outer vessel 200, wherein an evacuated space V is arranged at least in certain regions between the inner vessel 100 and the outer vessel 200, wherein at least one electrical heating element 130 for warming the fuel is provided in the inner vessel 100.

ii) The cryogenic pressure vessel according to aspect i, wherein the heating element 130, when installed, runs parallel to the longitudinal axis A-A of the inner vessel 100.

iii) The cryogenic pressure vessel according to any one of the preceding aspects, wherein the inner vessel 100 has a connecting end piece 140, wherein a liner 110 and/or a fiber-reinforced layer 120 are/is connected to the connecting end piece 140, and wherein the heating element 130 projects from an internally situated face side 142 of the connecting end piece 140.

iv) The cryogenic pressure vessel according to aspect iii, wherein the internally situated face side 142 is spaced apart from the fiber-reinforced layer 120 such that the heat generated by the heating element 130 cannot warm the fiber-reinforced layer 120 to a temperature above a limit temperature beyond which damage to the fiber-reinforced layer 120 is likely.

v) The cryogenic pressure vessel according to any one of the preceding aspects, wherein the heating element 130 is surrounded at least in certain regions by a metal sleeve 135.

vi) The cryogenic pressure vessel according to aspect v, wherein the metal sleeve 135 is connected in fuel-tight fashion to the connecting end piece 140.

vii) The cryogenic pressure vessel according to any one of the preceding aspects, wherein the heating element 130 is provided at a first end P1 of the inner vessel 100, which is situated opposite a second end P2 at which a line for filling and/or extraction is provided.

viii) The cryogenic pressure vessel according to any one of the preceding aspects, wherein the inner vessel 100 is mechanically coupled to the outer vessel 200 by means of at least one connecting element 144, wherein the electrical lines 133 of the heating element 130 are routed within the connecting element 144.

ix) The cryogenic pressure vessel according to aspect viii, wherein the connecting element 144 is produced at least partially from a fiber composite material.

x) The cryogenic pressure vessel according to any one of the preceding aspects, wherein the ratio of the heating length lh, projecting into the inner vessel 100, of the heating element 130 to the total length L100 of the inner vessel 100 is between 0.1 and 0.8 or between 0.25 to 0.5.

xi) A motor vehicle comprising a cryogenic pressure vessel according to any one of the preceding aspects.

The technology disclosed here will now be discussed on the basis of the figures.

DETAILED DESCRIPTION OF THE DRAWINGS

Figure 1:
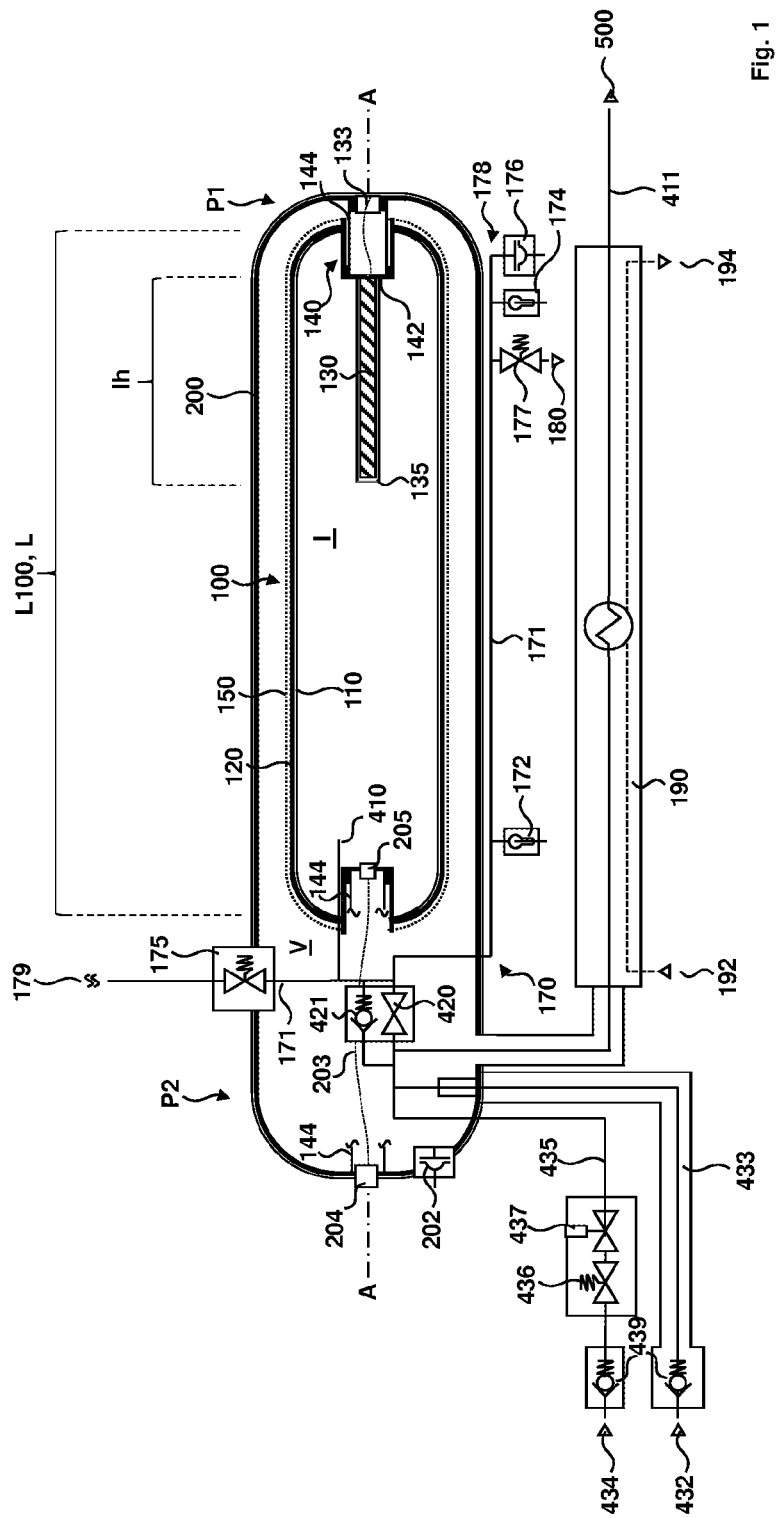
FIG. 1 is a schematic cross-sectional view of the pressure vessel disclosed here.

FIG. 1 schematically shows a view of the pressure vessel system disclosed here. The pressure vessel comprises an inner vessel 100 that is surrounded by the outer vessel 200. The evacuated space V is situated between the inner vessel 100 and the outer vessel 200. The inner vessel 100 comprises a liner 110 that is surrounded by a fiber-reinforced layer 120. Here, the filling and extraction line 410 is provided at the second end P2. It would likewise also be possible for two separate lines for filling and extraction to be provided. For filling, the pressure vessel in this case comprises a cryogenic filling connection 432, which is fluidically connected to the tank shut-off valve 420, which in this case is operated at cryogenic temperatures. The fluidic connection between the tank shut-off valve 420 and the cryogenic filling connection 432 is equipped with thermal insulation 433, for example a partially evacuated space and/or insulation with foamed plastics and/or aerogels. The cryogenic filling connection 432 is couplable to a corresponding refueling station coupling.

It is additionally preferably possible for a further filling connection 434 for warm refueling to be provided. The two filling connections 432, 434 are expediently configured such that the cryogenic filling connection 432 can receive cryogenic fuel at a fuel temperature which is lower, by at least 150 K or at least 180 K, than the lowest fuel temperature that the further filling connection 434 can receive. A pressure line 435 may advantageously be connected to the further filling connection 434, which pressure line, in the evacuated space V, opens into the cryogenic line system, in particular upstream of the tank shut-off valve 420 that is operated under cryogenic conditions, wherein a further tank shut-off valve 437 and/or a pressure-limiting valve 436 is preferably provided in said pressure line 435. The refueling of the pressure vessel can be reliably prevented by means of the further tank shut-off valve 437. The pressure limiting valve 436 may be configured to limit the maximum refueling pressure, preferably to the maximum admissible pressure of the pressure vessel that is allowable during the operation of the pressure vessel (generally the maximum operating pressure).

In a flow path that is fluidically parallel with respect to the cryogenic tank shut-off valve 420, there is provided a refueling check valve 421 that is configured to allow fuel to pass through to the pressure vessel during the refueling process, and to block the passage in all other operating states (for example extraction or storage). Here, check valves 439 are furthermore provided at the filling connections 432, 434, which check valves prevent a backflow of the fuel into the refueling station or into the surroundings.

The sensor arrangement provided at the second end P2 comprises in this case a sensor element 205 that is configured to detect a signal that is indicative of at least the fuel temperature in the internal volume I. The sensor element 205 is connected to the sensor connection 204 via the electrical line 203. The sensor connection 204 is in this case provided on the outer vessel 200, and the sensor element 205 is provided on the inner vessel 100. Via the sensor connection 204, a control unit can be connectable or connected to the sensor element 205 via suitable elements such as electrical lines, bus systems etc. The sensor connection 204 and the sensor element 205 are accommodated within the connecting element 144. The connecting element 144 at the second end P2 is expediently constructed as disclosed in conjunction with the connecting element 144 of the first end P1. The sensor connection 204 and the sensor element 205 are in this case arranged coaxially with respect to one another and are preferably configured so as to be coaxial with the pressure vessel longitudinal axis A-A. The sensor element 205, the sensor connection and the electrical line 203 could alternatively or additionally (also) be provided at the first end P1 in the same way.

In this case, the heating element 130 is arranged at the first end P1, which is situated opposite the second end P2. The heating element 130 is in this case configured as a heating rod that extends concentrically with respect to the pressure vessel longitudinal axis A-A. The heating element 130 is a resistance heating unit. The heating element 130 comprises a metal sleeve 135 which forms the outer surface of the heating element 130 and which thus shields the heating element with respect to the fuel. The heating element 130 is in this case welded in fuel-tight fashion to an internally situated face side 142 of the connecting end piece 140 and projects into the internal volume I of the inner vessel 100. The face side 142 together with the peripheral wall 143 forms the pot-shaped connecting end piece 140.

The connecting end piece 140—also referred to as boss—comprises a second region, which in this case is connected to the liner 110 (in this case by means of at least one weld seam) and which is surrounded at least in certain regions by the fiber-reinforced layer 120. The face side 142 is in this case spaced apart from the fiber-reinforced layer 120 to such an extent i) that the limit temperature is not reached in the fiber-reinforced layer 120, and ii) that the unused toroidal structural space between inner vessel and outer vessel is as small as possible, and that the toroidal structural space is nevertheless sufficient to compensate for pressure-induced and/or temperature-induced changes in length, and the heat dissipation path in the connecting element 144 is of sufficient length.

The connecting element 144 is of tubular form and inserted into the pot-shaped connecting end piece 140. The connecting element 144 is formed at least in certain regions from a fiber composite material in order to thus minimize the introduction of heat into the inner vessel and compensate for any vibrations. The outer surface of the connecting element 144 lies in this case at least in certain regions against the inner surface of the peripheral wall 143 (cf. FIG. 2) and may form a floating bearing. At least one electrical line 133 may be accommodated in the interior of the connecting element 144. The at least one electrical line supplies electrical energy to the heating element 130 and provides the electrical signals for the open-loop and/or closed-loop control of the heating element 130. The ratio of the heating length lh, projecting into the inner vessel 100, of the heating element 130 to the total length L100 of the inner vessel 100 lies between 0.1 and 0.8 or between 0.25 to 0.5.

The pressure vessel furthermore comprises a pressure relief device 170. The pressure relief device 170 does not serve for the filling of the pressure vessel or for the extraction of fuel for the energy converter 500. Rather, the pressure relief device 170 generally serves for the relief of pressure in the event of a malfunction or fault or for the relief of pressure during very long standstill periods. The filling and extraction line 410 connects the internal volume I of the inner vessel 100 to a line system that is provided in the evacuated space V. The filling and extraction line 410 in this case comprises a T-piece that is fluidically connected to the pressure relief line 171. The pressure relief line 171 could likewise open directly in the internal volume I. In this case, two thermally activatable pressure relief apparatuses (TPRDs) 172, 174 are provided in the pressure relief line 171. For example, for this purpose, the pressure relief line 171 may be formed from multiple line elements, between which in each case one thermally activatable pressure relief apparatus 172, 174 is provided. If, for example, a thermal event occurs adjacent to the pressure relief apparatus 174, then the pressure relief apparatus 174 opens, for example by virtue of a fusible link melting or a glass ampule being destroyed. The fuel then escapes abruptly before the thermal event can cause a rupture of the inner vessel 100. Such an arrangement of the TPRDs is particularly space-saving and operationally reliable. The overpressure discharge valve 177 may particularly advantageously also be formed on the pressure relief line 171 and fluidically connected to the pressure relief line 171. It is preferable for the overpressure discharge valve 177 and/or the thermally activatable pressure relief apparatus 174 and/or the rupture element 176 to be formed as close as possible to the first line end 178 or as close as possible to the first end P1. It is advantageously thus possible for the pressure relief line 171 to serve as a heat exchange path such that the cryogenic fuel acts on the components with higher temperatures than at the other end of the pressure relief line 171 directly adjacent to the tank shut-off valve 420. The overpressure discharge valve 177 and/or the thermally activatable pressure relief apparatus 174 and/or the rupture element 176 and/or the overpressure safety valve 177 disclosed here are in this case directly fluidically connected to the internal volume I of the pressure vessel. In other words, no shut-off element (for example valve) that could possibly block the flow path for the relief of pressure is provided between the components and the internal volume I.

A further pressure relief line 171 branches off in the opposite direction from the T-piece, which further pressure relief line is fluidically connected to the overpressure safety valve 175. The overpressure safety valve 175 may be provided so as to be received in the outer vessel 200 from the outside. It is advantageously thus possible for the overpressure safety valve 175 to be exchanged without the need for additional access to the evacuated space V for this purpose.

The overpressure discharge valve 177 is fluidically connected to a fuel converter 180. If the fuel pressure increases to a value above the triggering pressure of the overpressure discharge valve 177, then fuel can flow out of the internal volume I into the fuel converter 180 via the pressure relief line 171 and via the overpressure discharge valve 177. The fuel converter 180 is configured to catalytically convert the fuel. It is thus the case that no or only negligibly little fuel passes into the surroundings. A throttle for limiting the discharge fuel mass flow may be provided in the fuel converter 180 or upstream of the fuel converter 180. If the fuel cannot be discharged, or cannot be sufficiently discharged, via the overpressure discharge valve 177 and the fuel converter 180, the pressure in the internal volume increases further until the triggering pressure of the overpressure safety valve 175 is reached. The triggering pressure of the overpressure safety valve 175 is in this case thus higher than the triggering pressure of the overpressure discharge valve 177. When the overpressure safety valve 175 is open, a mass flow can escape, which mass flow may be greater than the mass flow that can be catalytically converted by means of the fuel converter 180. The fuel can expediently be discharged via a suitable fuel outlet into the surroundings or into a suction-type fuel extraction device. For this purpose, channels may for example be provided which lead to a roof fin in the vehicle roof, via which the fuel escapes. If the overpressure safety valve 175 were to malfunction, then the pressure in the internal volume I could increase further until the triggering pressure of the rupture element 176 is reached, which is higher than the triggering pressure of the overpressure safety valve 175. If the rupture element 176 ruptures, then a rapid relief of pressure also occurs. The overpressure safety valve 175 and the rupture element 176 are of different construction, such that there is less likelihood of a failure of both components owing to the same fault. It is advantageous here if the overpressure safety valve 175 and the rupture element 176 are configured so as to be spaced apart from one another to a great extent. By virtue of the overpressure safety valve 175 being formed on the top side and the rupture element 176 being formed on the bottom side of the pressure vessel, there is increased likelihood that, in a normal situation and in an upside-down situation, even in the event of deformation of the bodyshell, the fuel can still be reliably released. For the same reason, it is particularly preferable here for the rupture element 176 and the overpressure safety valve 175 to be provided at different ends P1, P2 of the pressure vessel.

The tank shut-off valve 420 is also directly fluidically connected to the internal volume I of the inner vessel 100 in this case. The tank shut-off valve 420 is shown merely schematically. The tank shut-off valve is an electrically actuatable and normally closed valve. Downstream of the tank shut-off valve 420, the extraction path 411 extends to the energy converter 500. A heat exchanger 190 is provided in the extraction path, which heat exchanger has a coolant inflow path 192 and a coolant outflow path 194. The coolant may be extracted from a coolant circuit of the motor vehicle.

Figure 2:
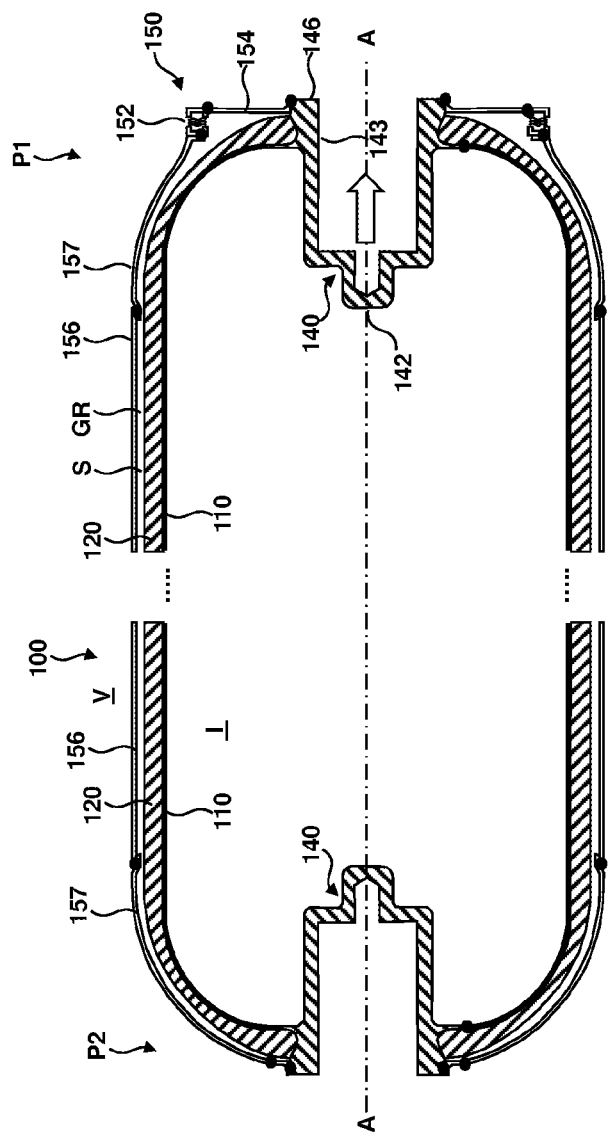
FIG. 2 is a further schematic detail view of the pressure vessel disclosed here.

FIG. 2 shows a schematic cross-sectional view of the inner vessel 100. The inner vessel 100 comprises the liner 110, which is surrounded by the fiber-reinforced layer 120. At the two ends of the inner vessel 100, there is provided in each case one connecting end piece 140 (also referred to as boss), which connecting end pieces are in this case of identical configuration for the sake of simplicity. Here, a barrier layer 150 is provided so as to be spaced apart by a gap S. The barrier layer 150 is in this case manufactured from a steel alloy. The barrier layer 150 together with the fiber-reinforced layer 120 forms a substantially gas-tight space GR. Here, the barrier layer 150 forms a body that surrounds the fiber-reinforced layer 120 of the inner vessel 100 completely and in substantially gas-tight fashion, such that the vacuum of the evacuated space V does not degrade in a functionally detrimental manner. The outer vessel 200 and further elements of the pressure vessel have been omitted for the sake of simplicity.

A test connection which may be provided, and through which the substantially gas-tight space GR may be accessible from the outside, is not shown. If any gases escape from the fiber-reinforced layer, these cannot escape into the evacuated space V, owing to the sealing action of the barrier layer 150. The gases collect in the substantially gas-tight space GR. In one configuration, the escaped gases can be extracted through the test connection.

The gap S may be selected such that, even in the event of maximum expansion of the inner vessel 100 in a radial direction, the fiber-reinforced layer 120 does not make contact with the barrier layer 150. For the compensation of length expansions in an axial direction, the barrier layer 150 in this case comprises a length compensation device 152. The length compensation device 152 is configured as a corrugated bellows or membrane bellows. The length compensation device 152 is fastened in substantially gas-tight fashion by way of a first end P1 to an annular plate 154 and by way of a second end P2 to a cap part 157 (also referred to as dome part). The one or more cap part(s) 157 is/are in turn connected in substantially gas-tight fashion to a generally cylindrical central part 156. In this configuration of the barrier layer 150, the barrier layer comprises an annular plate 154, two cap parts 157, one or two central part(s) 156 and a corrugated bellows 152. These parts are preferably produced from a metal material (in this case from a steel alloy) and particularly preferably from the same material and are cohesively connected to one another so as to close off the substantially gas-tight space GR to the outside. Depending on the manufacturing concept, the barrier layer 150 may be formed by fewer or more parts or semifinished parts. The annular plate 154 is welded in its center to the connecting end piece 140. In other words, the plate 154 is the connecting piece between corrugated bellows and boss. At its radial edge, the plate 154 is welded to the corrugated bellows. Even though only one annular plate 154 and only one length compensation device 152 are shown here, it would also be possible for in each case one annular plate 154 and one length compensation device 152 to be provided at both ends.

If the inner vessel 100 expands in an axial direction (illustrated here by an arrow), then the second end P2 moves outward. This change in length is simultaneously "locally" compensated at the second end P2 by the length compensation device 152. Weld seams are illustrated in FIG. 2 as black dots. Fewer or more weld seams may be provided depending on the configuration of the inner vessel 100.

In the context of the technology disclosed here, the expression "substantially" (for example "substantially vertical axis") encompasses in each case the exact characteristic or the exact value (for example "vertical axis") and in each case deviations that are not of significance for the function of the characteristic/of the value (for example "tolerable deviation from a vertical axis").

The above description of the present invention serves merely for illustrative purposes and not for the purposes of limiting the invention. In the context of the invention, various changes and modifications are possible without departing from the scope of the invention and its equivalents. In particular, the features disclosed in conjunction with
i) the pot-shaped connecting element (inner tank mounting);
ii) the heating device;
iii) the barrier layer;
iv) the discharge valve;
v) the rupture element;
vi) the refueling system; and
vii) the sensor arrangement, are in each case individually functionally independent and are also usable with other pressure vessels and in particular with other cryogenic pressure vessels. The combination thereof is however particularly advantageous.

The invention claimed is:

1. A cryogenic pressure vessel for storing fuel in a motor vehicle, comprising:
   an inner vessel having a plastics material layer;
   an outer vessel; and
   a barrier layer arranged at least in certain regions between the plastics material layer and an evacuated space, the barrier layer comprising a length compensation device that is configured to compensate changes in length of the inner vessel, wherein
   the evacuated space is arranged at least in certain regions between the inner vessel and the outer vessel.

2. The pressure vessel according to claim 1, wherein
   the barrier layer is configured and arranged so as to at least reduce passage of constituents escaping from the plastics material layer into the evacuated space, and
   a gap is formed at least in certain regions between the barrier layer and the plastics material layer.

3. The pressure vessel according to claim 1, wherein the length compensation device comprises at least one corrugated bellows element.

4. The pressure vessel according to claim 1, wherein
   the length compensation device is arranged directly adjacent to that an end of the inner vessel, the end configured as a floating bearing.

5. The pressure vessel according to claim 1, wherein the barrier layer is of a metal material.

6. The pressure vessel according to claim 1, wherein
   the plastics material layer is a fiber-reinforced layer that surrounds a liner, and
   the barrier layer separates the fiber-reinforced layer from the evacuated space in gas-tight fashion.

7. The pressure vessel according to claim 2, wherein
   the inner vessel has a connecting end piece, and
   a liner and/or a fiber-reinforced layer are/is connected to the connecting end piece.

8. The pressure vessel according to claim 7, wherein
   the connecting end piece is connected cohesively and in gas-tight fashion to the barrier layer.

9. The pressure vessel according to claim 7, wherein
   the barrier layer comprises an annular plate that extends radially outward from the connecting end piece.

10. The pressure vessel according to claim 9, wherein
    the length compensation device is provided at an outer edge of the annular plate, and
    the annular plate and/or the length compensation device is arranged so as to be set back in an axial direction in relation to an outer delimitation of the connecting end piece.

11. The pressure vessel according to claim 2, wherein
    a gas-tight space is formed between the barrier layer and the plastics material layer, and
    the pressure vessel is configured such that a gas composition is in the gas-tight space is evaluable from outside the pressure vessel.

12. The pressure vessel according to claim 11, wherein
    the gas-tight space comprises at least one test connection, and
    the test connection is led out of the outer vessel.

13. The pressure vessel according to claim 2, wherein at least one radiation insulator is arranged outside the barrier layer.

14. The pressure vessel according to claim 1, wherein at least one electrical heating element for warming the fuel is provided in the inner vessel.

15. The pressure vessel according to claim 14, wherein the heating element, when installed, runs parallel to or along a longitudinal axis of the inner vessel.

16. The pressure vessel according to claim 14, wherein the heating element projects from an internally situated face side of a connecting end piece of the inner vessel.

17. The pressure vessel according to claim 16, wherein the internally situated face side is spaced apart from a fiber-reinforced layer such that heat generated by the heating element cannot warm the fiber-reinforced layer to a temperature above a limit temperature.

18. The pressure vessel according to claim 14, wherein the heating element is surrounded at least in certain regions by a metal sleeve.

19. The pressure vessel according to claim 18, wherein the metal sleeve is connected in fuel-tight fashion to a connecting end piece of the inner vessel.

20. The pressure-vessel according to claim 14, wherein the heating element is provided at a first end of the inner vessel, which is situated opposite a second end at which a line for filling and/or extraction is provided.

21. The pressure vessel according to claim 14, wherein the inner vessel is mechanically coupled to the outer vessel by way of at least one connecting element, and electrical lines of the heating element are routed within the at least one connecting element.

22. The pressure vessel according to claim 21, wherein the connecting element is at least partially of a fiber composite material.

23. The pressure vessel according to claim 14, wherein a ratio of a heating length, projecting into the inner vessel, of the heating element to a total length of the inner vessel is between 0.25 to 0.8.

24. The pressure vessel according to claim 1, further comprising:
a pressure relief device for relieving the pressure vessel of pressure, wherein
the pressure relief device has at least one thermally activatable pressure relief apparatus, and
the pressure relief apparatus is directly fluidically connected to an internal volume of the pressure vessel via a pressure relief line.

25. The pressure vessel according to claim 24, further comprising:
at least one rupture element, wherein
the pressure relief apparatus and the rupture element are directly fluidically connected to the internal volume of the pressure vessel.

26. The pressure vessel according to claim 25, further comprising:
at least one overpressure discharge valve, wherein
at least one fuel converter is provided downstream of the overpressure discharge valve, and
the pressure relief apparatus and the overpressure discharge valve are directly fluidically connected to the internal volume of the pressure vessel.

27. The pressure vessel according to claim 26, wherein the pressure relief device comprises an overpressure safety valve, wherein
the overpressure safety valve is directly fluidically connected to the internal volume of the pressure vessel.

28. The pressure vessel according to claim 27, wherein the overpressure safety valve is provided so as to be spaced apart from the rupture element.

29. The pressure vessel according to claim 27, wherein the overpressure safety valve is provided at a side of the pressure vessel which is situated opposite the side at which the rupture element is formed.

30. The pressure vessel according to claim 27, wherein the rupture element is provided at a first end, and
the overpressure safety valve is provided at a second end that is situated opposite the first end.

31. The pressure vessel according to claim 25, wherein the inner vessel forms the internal volume that stores the fuel.

32. The pressure vessel according to claim 31, wherein the rupture element is provided outside the outer vessel.

33. The pressure vessel according to claim 32, wherein in the wall of the outer vessel, a further rupture element fluidically connected to the evacuated space is provided.

34. The pressure vessel according to claim 26, wherein a pressure relief line has a first line end, and
the rupture element and/or an overpressure discharge valve is formed at the first line end.

35. The pressure vessel according to claim 2, wherein a pressure relief line extends over a shell region of the outer vessel.

36. The pressure vessel according to claim 26, wherein a triggering pressure of the overpressure discharge valve is below a triggering pressure of the overpressure safety valve and/or below a triggering pressure of the rupture element.

37. A motor vehicle comprising at least one pressure vessel according to claim 27.

38. The motor vehicle according to claim 37, wherein the overpressure safety valve is fluidically connected to a fuel outlet provided at a vehicle roof.

* * * * *